W. A. BURT.
Altitude Instrument.
No. 16,002.
Patented Nov. 4, 1856.
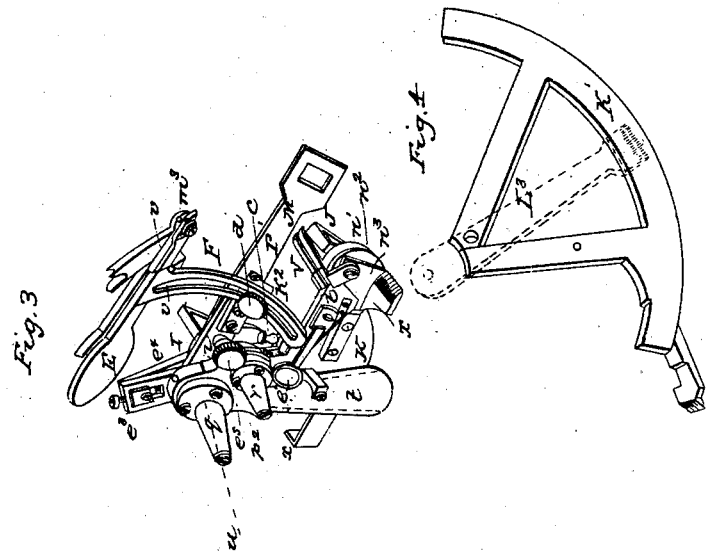
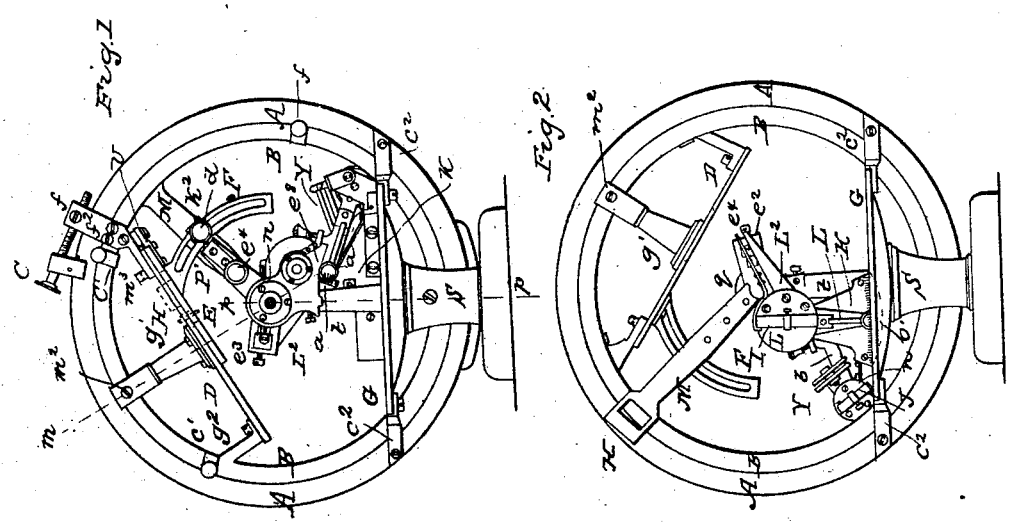

UNITED STATES PATENT OFFICE.

WILLIAM A. BURT, OF MOUNT VERNON, MICHIGAN.

EQUATORIAL SEXTANT.

Specification of Letters Patent No. 16,002, dated November 4, 1856.

*To all whom it may concern:*

Be it known that I, WM. A. BURT, of Mount Vernon, in the county of Macomb and State of Michigan, have invented an Instrument for Taking Azimuths, Altitude, and Time with One Observation, and that the following is a full, clear, and exact description of the principle or character which distinguishes it from all other things before known and of the usual manner of making, modifying, and using the same, reference being had to the accompanying drawings.

The nature of my invention consists in a new instrument for determining the position and bearings of ships at sea, which I denominate the equatorial sextant; said instrument being adapted to determining latitude, time, azimuth and altitude and also declination, by the means hereinafter described.

*Synopsis of the parts of the equatorial sextant.*—A is the meridian circle, B the latitude circle moving inside of the meridian circle, together with its tangent screw C; the face side of which latitude circle is divided to read and set off the declination of the celestial object and also the latitude. D the hour circle reading to minutes of arc by the vernier $v$, at the end of the revolving limb E, on which is a slotted arc F.

G is the azimuth circle at the center of which is a conical spindle $s$ on which a revolving sextant I, J, K, L, $x$ is placed.

I is the index glass, J the horizon glass, K the altitude arc, and L the limb and vernier of this arc, to which the index glass is attached. On the back side of the altitude arc there is a small arc $a$ and a limb $b$ leading from the attachment of the horizon glass to it, with a vernier and adjusting screw $c$ for the purpose of adjusting the horizon glass to the necessary correction for dip, refraction, semidiameter and parallax as the observation may require.

M is the declination limb and is set and clamped to the declination of the celestial object by its attachment to the arc F. Thus when the revolving limb E is moved over hour circle D it will give motion to revolving sextant I, J, K, L, $x$. The meridian circle A resting on a stand $s$ forms the main frame of the instrument, all the other parts being connected with this circle either directly or indirectly. The latitude circle B moves concentrically with and in contact with the inner periphery of circle A and is guided by clamps $c'$; when properly set, it can be clamped fast by clamp-screw $f$, and then finally adjusted by tangent screw C through the medium of the nut $f'$ and piece $f^2$ connected with the latitude circle. The hour circle D is firmly screwed to the arms $g$ $g'$ $g^2$ projecting from the latitude circle. The limb E with its vernier $v$ in contact with the divided face of circle D, revolves around the center of said circle D, the arm $g'$ serving as the center bearing for its revolutions and at the same time a means of adjusting the circle D to its proper place by means of the set screws $m'$, $m^2$. $i$ is a clamp screw to fasten this limb to the circle when properly set, and the tangent screw $h$ serves for its final adjustment through the medium of nut $m^3$ on limb E. The slotted arc F is screwed to the limb E; the piece $K^2$ moves over the slot of arc F, and can be clamped by screw $d$ passing through this slot. The piece $K^2$ serves as a bearing for the pivot $P'$ at the outer end of arm $n$ which arm turns about the horizontal axis of spindle $q$ projecting from the tubular standard or center $t$ which latter fits over and turns about spindle $s$ fastened to the lower part of circle A. The azimuth circle G, (concentric with spindle $s$) is fastened to circle A by clamps $c^2$. The center of the circles A and B is the point where the prolonged center line $m$ $m$ of arm $g'$, the center line $l$, $l$ of spindle $q$ and the center line $p$ $p$ of the spindle $s$ intersect each other. This point of intersection is at the same time the center of the slotted arc F. The altitude arc K is fastened to the projection $P^2$ on the tube $t$ and is concentric with the center line of the horizontal spindle $r$ which latter is the center of motion of limb L which limb carries the vernier of arc K and has also the index glass I attached to it.

The horizon glass J is attached to disk $n'$, which disk is attached to disk $n^2$ on arm $b$ by means of adjusting screws; the adjustment being for the purpose of fixing the parallelism between the horizon and index reflectors. The disk $n^2$ turns on a center disk projecting from the inner face of piece $n^3$, said center disk being conical so as to hold the disk $n^2$ to its bearings. This is not shown in the drawings, it being a common mode of construction in such cases, and others may be substituted if desired. The piece $n^3$ projects from the vernier $x'$ of the azimuth circle. The arm $b$ bearing at one end the vernier $a'$ and turning upon the center disk above mentioned, is adjusted by set screw $c$ attached to arc K. Extending from the lower portion of arc K is the sight $x$. The vernier $x'$ of the azimuth circle is attached to arc K in rear of the horizon glass. The small arc $a$ together with the arm $b$ and set screw $c$ serve for adjusting the horizon glass to the necessary correction for dip, refraction, semidiameter and parallax as the observation may require.

It will be seen from the above that the parts I, J, K, L, and $x$, form a common sextant which revolves upon spindle $t$. The revolution of this sextant is produced in the following manner. An arm $L^2$ projects from limb L which arm has a flat surface $e'$ parallel to a plane passing through the axis of $r$ and of the pin on which block $e^2$ works. A small block $e^2$ fastened to arm $e^3$ (which arm projects from arm $n$ above described) slides on and is kept in contact with said flat surface $e'$ by a spring arm $e^4$ extending from limb L.

It will be understood from the above that when limb E is moved the bearing $K^2$ being clamped to arc F extending from limb E, this bearing and consequently the arm $n$ will move about spindle $q$ and the block $e^2$ will act upon surface $e'$ and cause the limb L to move about spindle $r$. As the distance from spindle $r$ to spindle $q$ and from spindle $q$ to the center bearing or pivot of block $e^2$ are equal the angles read off on altitude arc K will be exactly one half of the angles read off on the circles A and B, thus reading as in the common sextant.

Y are dark glasses and H is the vernier of the declination arc and $e^7$, $e^8$, are magnifying glasses for reading the divisions of the verniers $e^6$ and arc K and verniers $a'$ and arc $a$ respectively.

For observation,—having set the latitude circle to a given latitude and the declination having been set off on the declination arc by the vernier H on limb M remove the limb M from its attachment to limb $n$ by removing the set screw $e^5$, and the time vernier $v$ being moved to the time of the observation will give motion to the revolving sextant and azimuth vernier $x'$ and altitude vernier $e^6$, and thus give the azimuth, altitude and time, when the celestial object is seen in the horizon.

It is obvious that this instrument may be used as a machine for computing from altitudes taken with the common sextant or other instruments and when it is used for this purpose only the sextant attachment may be dispensed with and the altitude arc K' substituted therefor. This arc K' must be attached to spindle $q$ and will then give the readings in whole degrees instead of the half readings of arc K attached to spindle $r$.

What I claim as my invention, is—

1. Combining with the common sextant, equatorial and horizontal movements substantially as herein above set forth for the purposes of obtaining latitude, time, azimuth, altitude and declination which are read from the instrument without computation.

2. I claim combining the limb E which moves over the face of the hour circle with the limb $n$ by means of the slotted arc (or equivalent thereof) and movable bearing $K^2$ and vertical spindle $s$.

3. I claim combining the latitude circle with the limb $n$ by means of the limb E (having its center of motion on the line $m$, $m$) the arc F and bearing $K^2$ and vertical spindle $s$ as set forth.

WM. A. BURT.

Witnesses:
T. BENTON YOUNG,
JAMES M. VAUGHAN.